Oct. 9, 1951  H. J. SMITH  2,570,399
RETRACTABLE SUN VISOR
Filed March 7, 1949
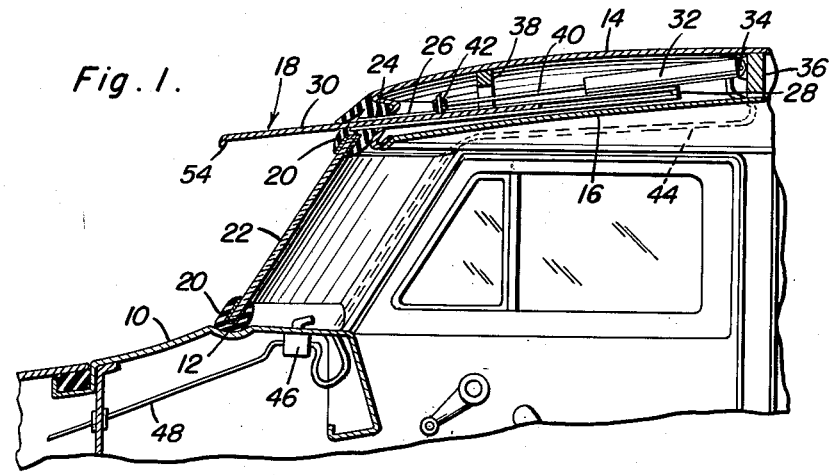
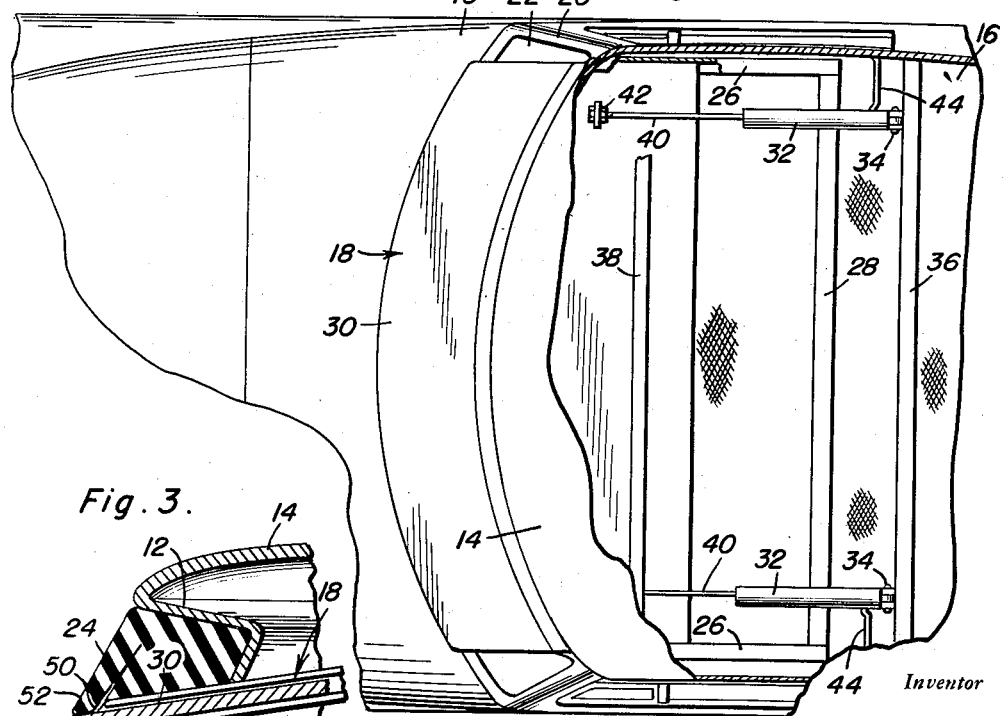
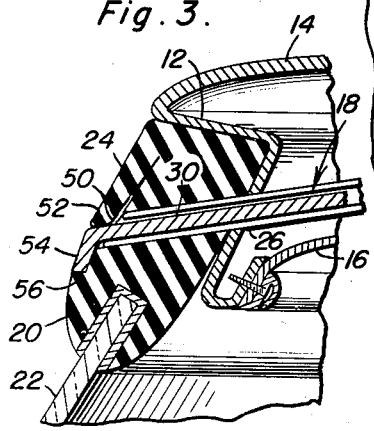
Inventor
Henry John Smith
By Clarence A. O'Brien
and Harvey B. Jacobson
Attorneys Patented Oct. 9, 1951

2,570,399

UNITED STATES PATENT OFFICE 2,570,399

RETRACTABLE SUN VISOR

Henry John Smith, Peconic, N. Y.

Application March 7, 1949, Serial No. 79,966

1 Claim. (Cl. 296—95)

This invention relates to new and useful improvements and structural refinements in sun visors for motor vehicles such as automobiles, etc., and the principal object of the invention is to enable the visor to be retracted into the body of the vehicle when it is not in use.

This object is achieved by the provision of what may be referred to as a retractable sun visor, and while I am aware that retractable visors of this nature have been devised in the past, in all such instances the installation or provision of the visor involved considerable structural changes in the arrangement of the vehicle body. In other words, the modern automobile is provided with what is commonly known as the "steel top" which became standard equipment only after expensive experimentation and costly manufacturing equipment. It is quite obvious that this equipment would become obsolete if the provision of a retractable sun visor were to involve considerable changes or modifications in the construction of the steel top, and the instant invention, therefore, seeks to avoid such a situation by providing a retractable sun visor which may be installed in a motor vehicle with very little, if any, structural changes in the arrangement of the steel top itself or the manufacturing equipment by which it is produced.

This object is achieved by the provision of a sun visor which is operatively associated with the replaceable frame of the vehicle windshield rather than with the steel top or roof itself, and an important feature of the invention lies in the structural arrangement of the windshield frame in such manner that the projectable and retractable visor may be easily slid forwardly and rearwardly therethrough, the sliding of the visor panel being effected by power actuated means.

Another feature of the invention resides in the provision of means for sealing the slidable visor panel in the windshield frame against adverse weather conditions.

Some of the advantages of the invention lie in its simplicity of construction, in its adaptability for expeditious and economical installation in vehicles of various types, and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is a fragmentary cross sectional view of a motor vehicle body, showing the invention associated therewith;

Figure 2 is a fragmentary top plan view of the subject shown in Figure 1, the same being partially broken away so as to reveal the invention, and;

Figure 3 is a fragmentary cross sectional detail illustrating the windshield frame in situ in the windshield opening of the vehicle body, and also showing the visor panel in its retracted position.

Like characters of reference are employed to designate like parts in the specification and throughout the several views.

Referring now to the accompanying drawings in detail, the reference character 10 designates the body of a motor vehicle such as an automobile, or the like, the same being provided with a windshield opening 12 and including a "steel top" or roof 14 under which is provided, in spaced relation, the usual headlining 16.

The invention consists of a retractable sun visor designated generally by the reference character 18, the same involving the provision of a resilient windshield mounting frame or gasket 20 which is positioned in the opening 12 and is adapted to accommodate the windshield glass 22 in the usual manner.

The upper portion or side of the perimetric windshield frame 20 is provided with a transverse slot 24, and a pair of spaced parallel guides 26 have their front portions embedded or otherwise secured to the frame 20 at the ends of the slot 24, the sides 26 extending rearwardly between the roof 14 and the headlining 16, as will be clearly apparent.

If desired, the rear ends of the guides 26 may be secured together by a transverse member 28, and it is to be noted that a visor panel 30, of a suitable configuration, is slidable forwardly and rearwardly in the guides 26 and through the slot 24 of the windshield frame 20, the panel 30 being slidable from its retracted position between the roof 14 and headlining 16 to its projected position forwardly and above the windshield 22, as shown in Figure 1.

The sliding of the visor panel 30 may be accomplished in any suitable manner, such as for example, by a pair of air cylinders or hydraulic cylinders 32 connected as at 34 to one of the roof beams 36, 38 of the steel top, the cylinders 32 including reciprocable piston rods 40 which, in turn, are operatively connected to the panel 30 as at 42. The cylinders 32, which may be energized by hydraulic pressure or air pressure, as desired, and receive their actuating medium through suitable tubes 44 connected to a control valve 46 on the instrument panel of the motor vehicle, the valve 46, in turn, being connected by a conduit 48 to an air compressor or a hydraulic pump (not shown), preferably driven by the vehicle engine.

In any event, the visor actuating means are so arranged that by simply manipulating the valve 46, the panel 30 may be slid forwardly, rearwardly, or held in a predetermined position, as required by driving conditions.

Means are also provided for preventing adverse weather from gaining entry into the body of the vehicle through the slot 24 in the windshield frame 20, these means involving the formation of a transverse slit 50 in the upper portion of the windshield frame, so as to result in the formation of a resilient, transversely extending tongue or strip 52 at the upper longitudinal edge of the slot 24, the lower end or edge of the tongue or strip 52 being in frictional engagement with the upper surface of the visor panel 30, whereby weather is excluded from the slot 24, as will be clearly apparent.

In addition, the forward edge of the panel 30 may be provided with a downturned flange 54, which flange is receivable in a transverse recess 56 provided at the lower longitudinal edge of the slot 24, thus assuring additional protection against the entry of rain, etc., into the slot when the visor panel is retracted.

It is believed that the advantages and use of the invention will be readily understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

In combination with a motor vehicle body provided with a windshield opening and including a roof and headlining thereunder in spaced relation, a retractable sun visor comprising a resilient windshield mounting frame positioned in said opening and formed in its upper portion with a transverse slot, a pair of guides having forward portions thereof secured in said frame at the ends of said slot and extending rearwardly therefrom between said headlining and roof, a transverse panel slidable forwardly and rearwardly in said guides and through said slot from a retracted position in said body to a projected position above the windshield, resilient sealing means provided on said frame at one longitudinal edge of said slot and frictionally engaging said panel, and means operatively connected to said panel for sliding the same, a portion of said resilient frame above said slot being provided with an upwardly extending longitudinal slit, whereby a portion of the frame disposed forwardly of the slit affords a resilient bendable strip having its lower edge in engagement with said panel and constituting said sealing means.

HENRY JOHN SMITH.

REFERENCES CITED

The following references are of record in the file of this patent:

UNITED STATES PATENTS

| Number | Name | Date |
| --- | --- | --- |
| 1,447,062 | Clark | Feb. 27, 1923 |
| 1,484,687 | Veeder | Feb. 26, 1924 |
| 1,834,469 | Mills et al. | Dec. 1, 1931 |
| 2,009,445 | Gould | July 30, 1935 |
| 2,242,746 | Dean | May 20, 1941 |
| 2,458,918 | Rea | Jan. 11, 1949 |
| 2,529,903 | Nichols | Nov. 7, 1950 |